United States Patent
Poggio et al.

(10) Patent No.: US 6,236,931 B1
(45) Date of Patent: May 22, 2001

(54) METHOD OF CONTROLLING THE DIRECT INJECTION OF FUEL INTO A COMBUSTION CHAMBER OF AN INTERNAL COMBUSTION ENGINE

(75) Inventors: Luca Poggio, Spinetta Marengo; Marco Secco, Nizza Monferrato; Andrea Gelmetti, Bologna, all of (IT)

(73) Assignee: Magneti Marelli S.p.A., Milan (IT)

( * ) Notice: Subject to any disclaimer, the term of this patent is extended or adjusted under 35 U.S.C. 154(b) by 0 days.

(21) Appl. No.: 09/448,462

(22) Filed: Nov. 24, 1999

(30) Foreign Application Priority Data

Nov. 26, 1998 (IT) ............................... B098A0662

(51) Int. Cl.$^7$ ........................... F02M 7/00; F02D 41/04; F02D 43/04
(52) U.S. Cl. ..................... 701/104; 123/305; 123/435; 701/105
(58) Field of Search .................... 123/295, 299, 123/300, 305, 435; 701/104, 105

(56) References Cited

U.S. PATENT DOCUMENTS

| | | | |
|---|---|---|---|
| 4,379,332 | * 4/1983 | Busser et al. | 701/104 |
| 5,156,126 | * 10/1992 | Ohkubo et al. | 123/435 |
| 5,222,481 | * 6/1993 | Morikawa | 123/435 |
| 5,313,920 | * 5/1994 | Matsushita | 123/435 |
| 5,718,203 | 2/1998 | Shimada et al. | 123/435 |
| 5,765,532 | * 6/1998 | Loye | 701/104 |
| 5,771,861 | * 6/1998 | Musser et al. | 701/104 |
| 5,950,598 | * 9/1999 | Wenzlawski et al. | 123/435 |
| 6,062,193 | * 5/2000 | Gatellier | 123/435 |
| 6,088,647 | * 7/2000 | Hemberger et al. | 701/104 |

FOREIGN PATENT DOCUMENTS

| | | |
|---|---|---|
| 0589517 | 3/1994 | (EP) . |
| 0675277 | 10/1995 | (EP) . |
| 2762647 | 10/1998 | (FR) . |
| 62-206243 | 2/1988 | (JP) . |

OTHER PUBLICATIONS

EPO Search Report, Dated Apr. 2, 2000.

* cited by examiner

Primary Examiner—Willis R. Wolfe
(74) Attorney, Agent, or Firm—Liniak, Berenato, Longacre & White

(57) ABSTRACT

Method of controlling the direct injection of fuel into a combustion chamber of an internal combustion engine, according to which, in order to effect injection in relation to a first stroke of the cylinder starting from a dead center, the following steps are performed: estimating during a stroke of the cylinder preceding the first stroke the pressure which will be present in the suction manifold at the first dead center, estimating an injection advance for the injection on the basis of the estimation of the pressure in the suction manifold, detecting the pressure in the fuel manifold, estimating the mean pressure which will be present in the chamber during the injection on the basis of the estimates effected in the preceding steps and on the basis of a function representative of the course of the pressure in the combustion chamber under reference operating conditions of the engine, estimating the mean flow rate of the injector during the injection on the basis of the pressure difference defined by the pressure detected in the fuel manifold and the mean pressure estimated in the chamber, and calculating and programming a delivery interval for the injector on the basis of the mean flow rate estimated and of the quantity of fuel to be injected.

17 Claims, 7 Drawing Sheets

METHOD OF CONTROLLING THE DIRECT INJECTION OF FUEL INTO A COMBUSTION CHAMBER OF AN INTERNAL COMBUSTION ENGINE

This invention relates to a method of controlling the direct injection of fuel into a combustion chamber of an internal combustion engine.

BACKGROUND OF THE INVENTION

As is known, direct injection internal combustion engines have a suction manifold connected to the cylinders of the engine in order to supply an air flow thereto, a fuel manifold for receiving the high-pressure fuel to supply to the said cylinders and a plurality of injectors, each of which is connected to the fuel manifold and is provided with a delivery nozzle disposed directly opposite a respective combustion chamber.

The fuel manifold receives the fuel from a high-pressure pump which is connected to the fuel storage tank, while each injector is associated with a respective cylinder and is controlled for the direct injection of fuel therein.

The supply of fuel into the cylinders is controlled by the control unit of the engine, which drives each injector by means of the generation of a respective control signal indicating the delivery time interval, i.e. the interval within which the injector must allow for the passage of fuel from the fuel manifold to the combustion chamber.

In particular, in relation to one single injection operation into one cylinder, the control unit calculates both the quantity of the fuel to be delivered and the injection advance, i.e. e.g. the time interval elapsing from the final theoretical moment of the injection to the moment at which pistons associated with the cylinder will be situated in the next upper dead centre position.

The control unit must therefore calculate and programme the delivery time interval to allow for the injection of the quantity of fuel calculated.

On the other hand, in order to be able to calculate the delivery time interval accurately, the delivery characteristics of the injector (e.g. the capacity) must be taken into account, these being highly dependent on the pressure difference present at the ends of the said injector, i.e. on the difference between the pressure present in the fuel manifold and the pressure present in the interior of the combustion chamber during the injection.

The internal pressure of the fuel manifold can generally vary between a predetermined interval including a reference pressure value (generally a pressure value of between 40 and 120 bar). The pressure in the interior of the combustion chamber, on the other hand, is highly variable, both as a function of the position of the throttle valve and as a function of the stroke of the cylinder in which the injection is supposed to take place (typically suction stroke and/or compression stroke).

Therefore, in order to be able to effectively inject the desired quantity of fuel, it is necessary to solve the problem of accurately estimating the pressure difference which will be present at the ends of the injector during the injection.

If the calculation of the delivery time interval is in fact based on the value of a pressure difference deviating significantly from the value which will actually be present during the injection, the quantity of fuel which will be supplied to the cylinder will deviate from the desired quantity. This deviation in the quantity of fuel injected is particularly harmful as it alters the air/fuel ratio with respect to the objective value, as a result of which, in addition to leading to a deterioration of the combustion, it can give rise to an increase in consumption or a loss of power, or can affect the correct operation of the catalytic converter.

SUMMARY OF THE INVENTION

The aim of this invention is to provide a method of controlling injection which solves the problem described hereinabove, i.e. which allows for the very precise determination of the delivery time interval ensuring the supply of the desired quantity of fuel.

This invention provides a method of controlling the direct injection of fuel into a combustion chamber of an internal combustion engine of the type described in claim 1.

BRIEF DESCRIPTION OF THE DRAWINGS

This invention will now be described with reference to the accompanying drawings illustrating a preferred non-limiting embodiment and in which.

DETAILED DESCRIPTION OF THE INVENTION

Figure 1:
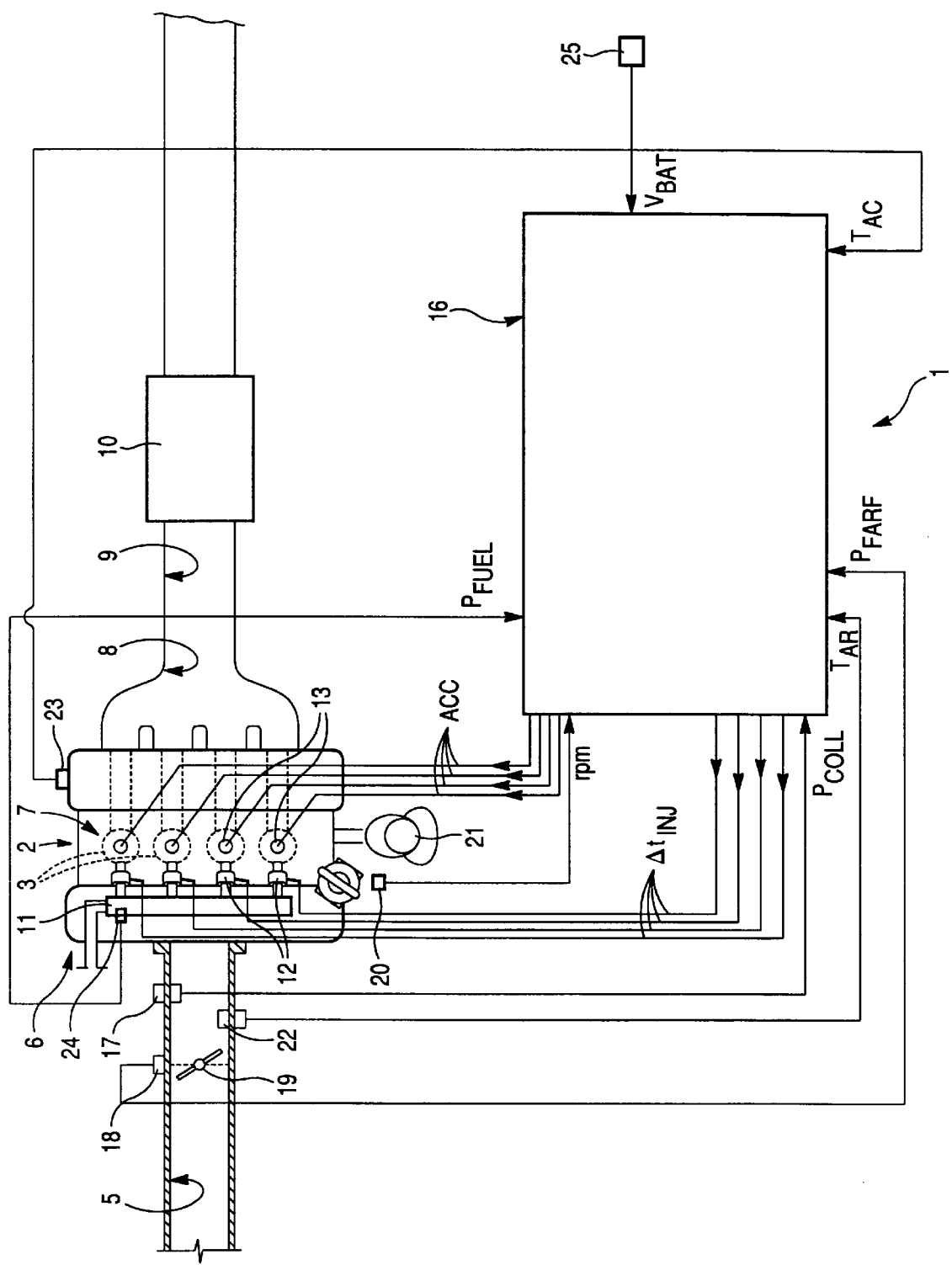
FIG. 1 is a diagrammatic view of a device for controlling the direct injection of fuel into an internal combustion engine, implementing the method of this invention.
Figure 2:
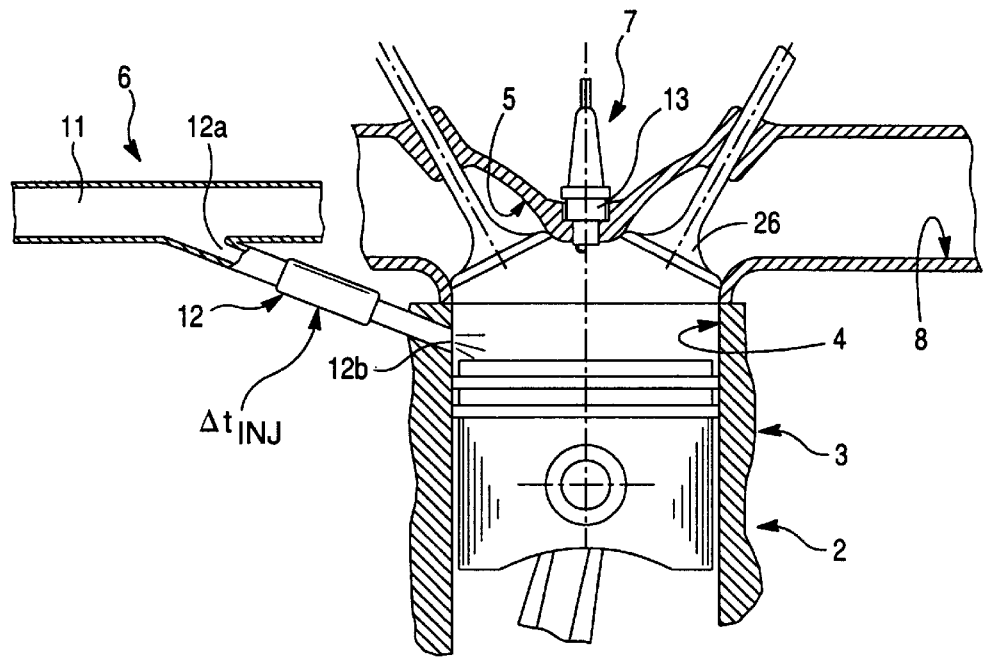
FIG. 2 shows a detail of the engine of FIG. 1.

With reference to FIG. 1, the reference numeral 1 schematically designates a control device of a direct injection internal combustion engine 2. In the example shown, the engine 2 is a petrol engine provided with four cylinders, designated by the reference numeral 3, each of which defines a respective combustion chamber 4 in correspondence with an upper end thereof (FIG. 2).

The engine 2 has a suction manifold 5 for supplying an air flow towards the cylinders 3, a fuel system 6 for supplying the petrol directly to the combustion chambers 4 and an ignition device 7 to trigger combustion of the air/petrol mixture in the interior of the cylinder 3.

The engine 2 moreover has an exhaust manifold 8 capable to convey the combustion gases expelled from the combustion chambers into an exhaust pipe 9 along which is disposed a catalytic converter 10 (of known type) for reducing the pollutants present in the exhaust gases before the latter are emitted into the external environment.

The fuel system 6 comprises a fuel manifold 11 for receiving and accumulating the high-pressure petrol delivered by the fuel pump (not shown) and a pressure regulator (of known type and not shown) for stabilising the pressure in the fuel manifold 11 at a predetermined pressure value generally included between 40 and 120 bar. The fuel system 6 moreover comprises a plurality of injectors 12, each of which has one end 12a communicating with the fuel manifold 11 (FIG. 2) and is provided with a delivery nozzle 12b disposed directly facing a respective combustion chamber 3. Each injector 12 is controlled by means of a respective delivery enabling signal $\Delta t_{INJ}$ in order to supply fuel from the fuel manifold 11 to the interior of the relevant combustion chamber 4.

The ignition device 7 has a plurality of spark plugs 13, each of which is positioned in correspondence with a respective combustion chamber 4 and is controlled in order to trigger combustion.

The control device 1 comprises an electronic control unit 16 which has a plurality of input and output connections by means of which it controls all of the functions of the engine 2.

Only those connections relevant for the purposes of the description of the subject matter of this invention are shown in FIG. 1. In particular, the control unit 16 controls the opening and closure of each injector 12 by means of the delivery enabling signal $\Delta t_{INJ}$ indicating the time interval within which the injection of the petrol into the relevant combustion chamber 4 must take place. In FIG. 1, the reference ACC designates the control signal by means of which the control unit 16 drives each spark plug 13 in order to trigger combustion in the relevant cylinder 3.

The control unit 16 is connected to a pressure sensor 17 in order to receive a signal $P_{COLL}$ indicating the pressure in the suction manifold 5 and cooperates with a position sensor 18 for detecting the position $P_{FARF}$ of the throttle value 19 which is disposed along the suction pipe 5 in order to regulate the air flow into the cylinders 3. The control unit 16 is moreover connected to an angular velocity sensor 20 of the crankshaft 21 in order to receive an rpm signal indicating the number of revolutions per minute and cooperate with two temperature sensors 22 and 23, the sensor 23 detecting the temperature $T_{AC}$ of the coolant of the engine, and the sensor 22 detecting the temperature $T_{AR}$ of the air present in the suction manifold 5. The control unit 16 is also connected to a pressure sensor 24 disposed in the fuel manifold 11 and capable to indicate the internal pressure $P_{FUEL}$ of the said manifold, i.e. the pressure of the end 12a of the injectors 12. The control unit 16 finally receives at its input a signal $V_{BAT}$ from a sensor 25 for detecting the voltage of the battery of the engine.

Figure 3:
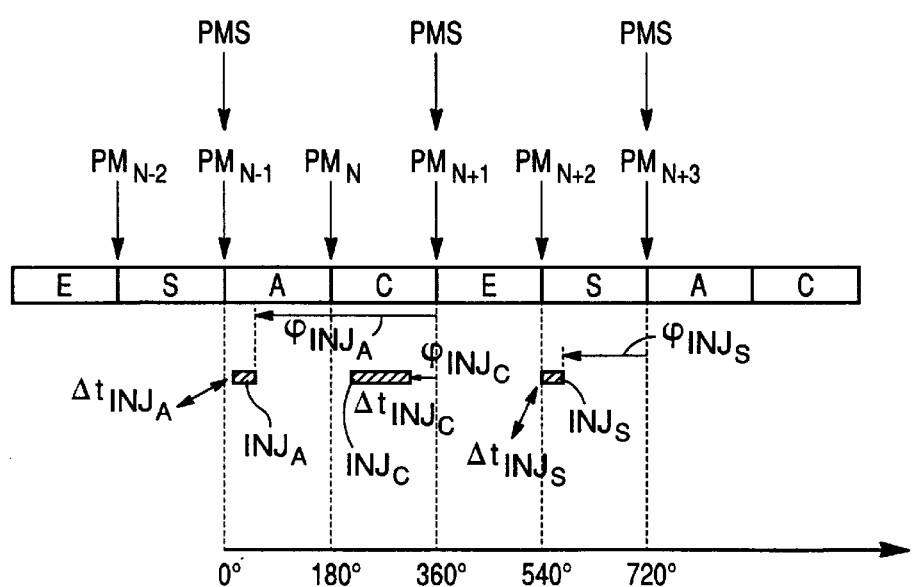
FIG. 3 is a diagram in relation to a cylinder of the engine showing a series of injection operations over time.

In direct injection engines, the injection of fuel into the interior of a combination chamber 4 can be effected during the suction stroke and/or during the compression stroke of the relevant cylinder 3, but, as is shown in FIG. 3, also during the exhaust stroke of the cylinder 3, i.e. when the exhaust valve 26 (FIG. 2) associated with the cylinder is already open. FIG. 3 in fact shows one possible series of injection operations into the interior of an identical suction/compression/expansion/exhaust cycle of a cylinder 3 over time. In the figure, the reference $INJ_A$ designates injection in the suction stroke A, $INC_C$ designates injection in the compression stroke C and $INJ_S$ designates injection in the exhaust stroke S. The injection operations $INJ_A$ and $INJ_C$ provide the fuel taking part in the combustion and therefore in the generation of engine torque, whereas the injection operation $INJ_S$ can be effected, e.g. if it is desired to accelerate the heating of the catalytic converter 10 following cold start of the engine. In fact, if the air/fuel mixture taking part in the combustion is lean, i.e. generates exhaust gases rich in oxygen, the fuel injected during the injection $INJ_S$ can give rise to residual combustion which burns the excess oxygen present in the still burning exhaust gases, thereby generating heat towards the catalytic converter 10.

According to this invention, the control device 1 implements a method of controlling the injection of fuel, according to which there is optimum regulation of the delivery time interval ($\Delta t_{INJ}$) of the relevant injector 12 for each injection INJ of the fuel into a cylinder 3 to be performed in order to supply exactly the desired quantity of fuel for this injection. Referring to the injection operations $INJ_A$, $INJ_C$ and $INJ_S$ of FIG. 3, the method therefore allows for the determination of the delivery time intervals $\Delta t_{INJA}$, $\Delta t_{INJC}$ and $\Delta t_{INJS}$ relating to these injection operations.

In FIG. 3, the suction/compression/expansion/exhaust cycle is expressed in mechanical degrees and the reference symbols $PM_{N-2}$, $PM_{N-1}$, $PM_N$, $PM_{N+1}$, $PM_{N+2}$ and $PM_{N+3}$ designate the moments at which the piston assumes the relative upper or lower dead centre positions. According to what is shown, the injection operation $INJ_A$ is actuated successively at the moment $PM_{N-1}$, while the injection operations $INJ_C$ and $INJ_S$ are actuated respectively at moments following the moments $PM_N$ and $PM_{N+2}$ respectively.

The control method of this invention will now be described with reference to FIG. 4, referring for the sake of simplicity to a generic injection operation INJ (FIG. 5) which must be actuated after the generic moment $PM_N$ in the compression stroke, without thereby losing this generality. The method provides for controlling the opening time of the injector 12 on the basis of the value of its flow rate, which is estimated from the actual drop in pressure which will be present at the ends of the said injector during the injection.

Figure 4:
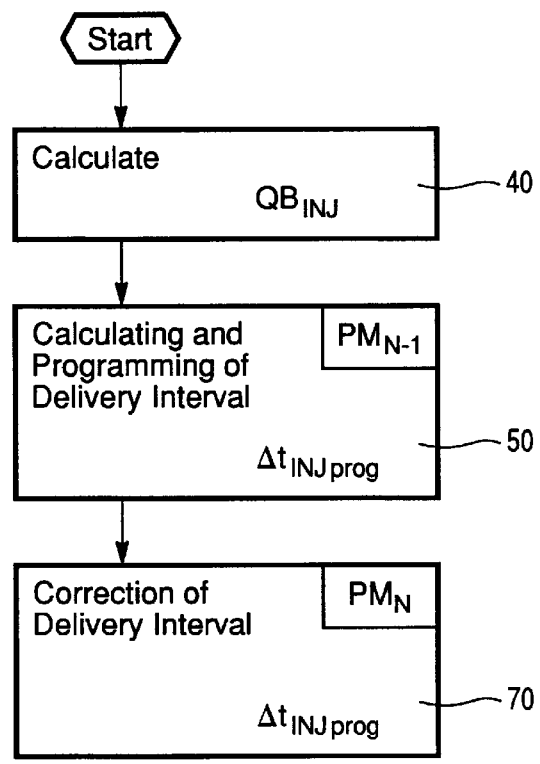
FIG. 4 is a block diagram of the control method of this invention.

With reference to FIG. 4, an initial START block is followed by a block 40 in which the control unit 16 calculates the quantity of fuel $QB_{INJ}$ to be injected into the cylinder 3 in correspondence with the injection operation INJ in accordance with known methods. The quantity of fuel $QB_{INJ}$ is determined with at least one dead centre advance with respect to the dead centre $PM_N$ for the actuation of the injection, i.e. at least the dead centre $PM_{N-1}$.

The block 40 is followed by a block 50 (described in detail hereinafter) in which, departing from the moment $PM_{N-1}$ (i.e. with a dead centre advance with respect to the dead centre point $PM_N$ for actuation), the control unit 16 calculates and programmes the delivery time interval $\Delta t_{INJprog}$ relating to this injection operation. As will be described hereinafter, the time interval $\Delta t_{INJprog}$ is calculated on the basis of the actual value of the pressure $P_{FUEL}$ in the fuel manifold 11 and on the basis of an estimation of the mean pressure $P_{CAMmean}$ which will be present in the combustion chamber 4 during the injection. This estimation of the means pressure $P_{CAMmean}$ in the combustion chamber is effected from measured data available at the moment $PM_{N-1}$.

The functional block 50 is followed by a functional block 70 (described in detail hereinafter) in which, departing from the moment $PM_N$, the control unit 16 performs a procedure for correcting the delivery interval $\Delta t_{INJprog}$ programmed. This correction procedure calculates the delivery interval once again on the basis of a new estimation of the mean pressure in the combustion chamber $P_{CAMmeanNEW}$ and, moreover, takes instantaneous changes in the pressure $P_{FUEL}$ in the fuel manifold 11 into account. As will be described, the new estimation of the pressure $P_{CAMmeanNEW}$ is effected from measured data available at the moment $PM_N$. In other words, in the block 70, the control unit 16 performs a new calculation of the delivery interval and, if possible, effects new programming of the injection in order to guarantee the delivery of the required quantity of petrol $QB_{INJ}$ with optimum accuracy.

Figure 6:
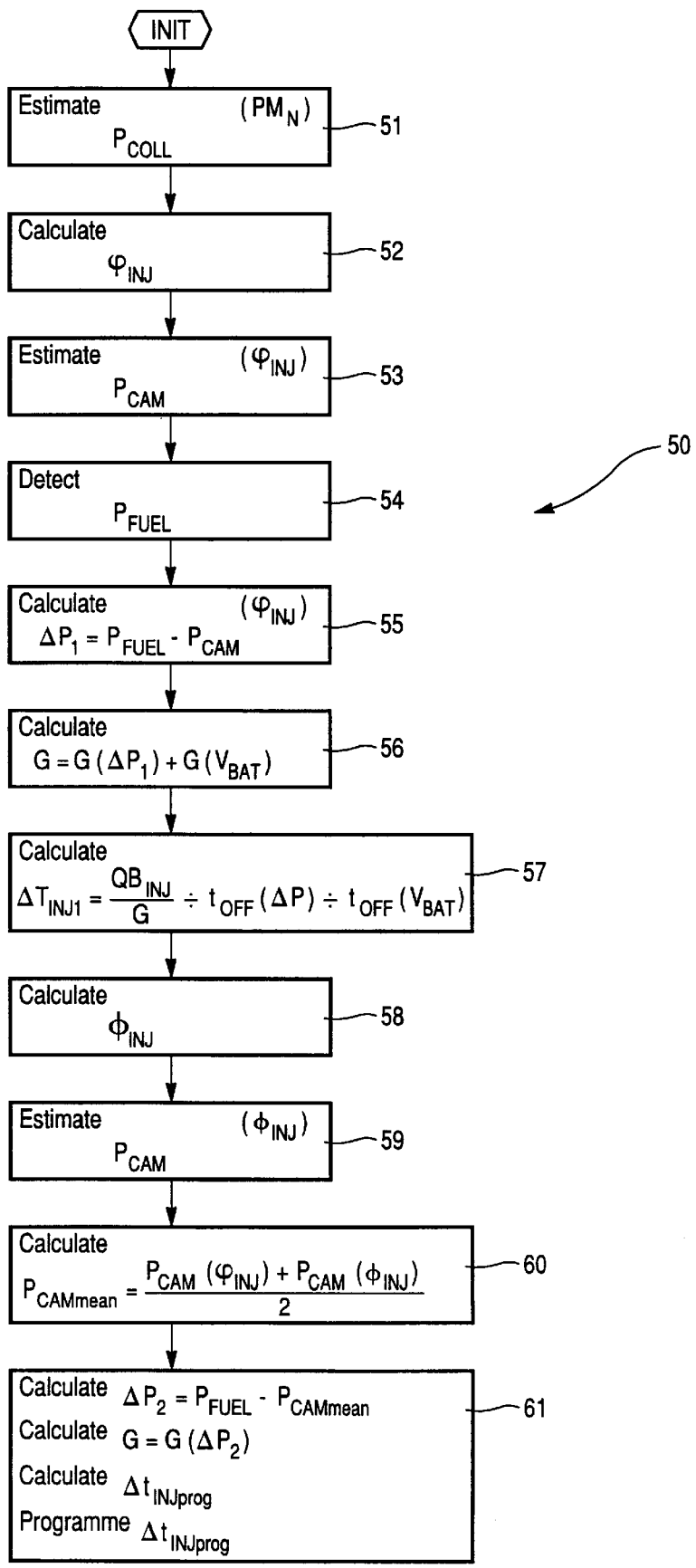
FIGS. 6 and 7 show in detail the function blocks of the diagram of FIG. 4.

The functional block 50 will now be described with reference to FIG. 6.

The initial block INIT is followed by a block 51 in which, in correspondence with the dead centre $PM_{N-1}$, the control unit 16 estimates the value of the pressure in the suction manifold 5 at the moment $PM_N$ (i.e. $P_{COLL}(PM_N)$) from the inputs available at the moment $PM_{N-1}$. As will be described in more detail hereinafter, one method which can be used to estimate this pressure value $P_{COLL}(PM_N)$ is the one proposed by Italian Patent Application TO94A000152 of Mar. 4, 1994 (this patent application has been extended to give rise to the following patent applications: EP 95102976.8 of Mar. 2, 1995, U.S. Ser. No. 08/397,386 of Mar. 2, 1995 and BR 9500900.0 of Mar. 3, 1995).

The output of the block 51 is followed by a block 52 in which the control unit 16 calculates the value of the injection advance $\phi_{INJ}$ relating to the injection operation INJ, which is normally expressed in mechanical degrees and can define in an equivalent manner the moment at which the injection should be initiated or, alternatively, the moment at which the said injection should be terminated. In the example shown (see FIGS. 3 and 5), the injection advance $\phi_{INJ}$ defines the theoretical moment at which the injection should be terminated and represents the time interval elapsing from this moment to the moment at which the piston reaches the next upper dead centre PMS. The injection advance $\phi_{INJ}$ is calculated from the value of the pressure in the suction manifold 5 estimated in the block 51 (i.e. $P_{COLL}(PM_N)$) and from the actual value of the rpm signal (i.e. the number of revoluations per minute), by means of known algorithms which are not shown (e.g. electronic tables).

Figure 8:
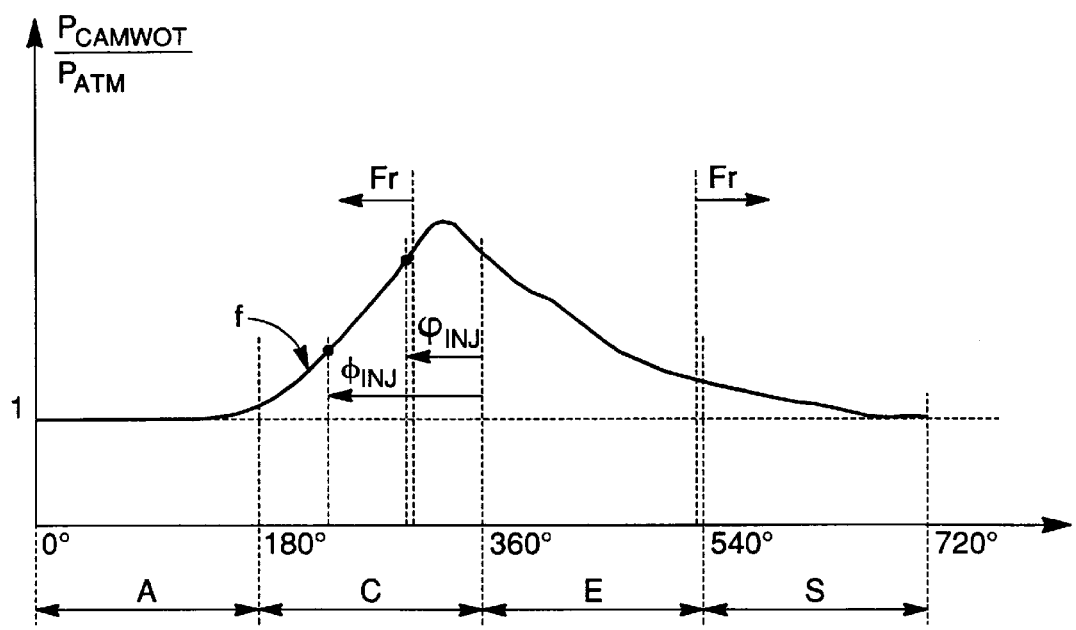
FIG. 8 shows the course of a function expressing the dependency of the internal pressure of the combustion chamber (standardised to the value of atmospheric pressure) on the angle of rotation of the crankshaft, i.e. in the various strokes of the cylinder.

The block 52 is then followed by a block 53 in which the pressure $P_{CAM}(\phi_{INJ})$ which will be present in the interior of the combustion chamber 4 at the moment corresponding to the value of the injection advance $\phi_{INJ}$, i.e. in this case, at the moment at which the injection INJ terminates, is estimated. This estimation is effected according to the invention on the basis of the value of the pressure $P_{COLL}(PM_N)$ estimated in the suction manifold 5 and on the basis of a function f (see FIG. 8) which provides the course of the pressure in the combustion chamber 4 $P_{CAMWOT}$ (when the throttle value 19 is in a completely open state) standardised to the value of atmospheric pressure $P_{ATM}$ in order to vary the angle of rotation of the engine (0–720°).

In particular, the function f is stored in the control unit 16 and the pressure $P_{CAM}(\phi_{INJ})$ is estimated according to the equation:

$$P_{CAM}(\varphi_{INJ}) \cong P_{COLL}(PM_N) \cdot \frac{P_{CAMWOT}}{P_{ATM}}(\varphi_{PMS} - \varphi_{INJ})$$

where $\phi_{PMS}$ designates the phase of the upper dead centre PMS with respect to which the injection advance $\phi_{INJ}$ has been determined. $\phi_{PMS}$ is clearly equal to 360° for the injection operations $INJ_A$ and $INJ_C$, whereas it is equal to 720° for the injection operation $INJ_S$ (see FIG. 3).

The value estimated for the pressure $P_{CAM}(\phi_{INJ})$ therefore represents the pressure of the delivery nozzle 12b of the injector 12 at the end of the injection operation INJ.

The output of the block 53 is followed by a block 54 in which the control unit 16 detects the actual value of the pressure $P_{FUEL}$ present in the interior of the fuel manifold 11 by means of the connection with the sensor 24 (FIG. 1). As is known, the pressure $P_{FUEL}$ is sampled by the control unit with a fixed sampling time, generally equal to 4 msec. The actual value of the pressure $P_{FUEL}$ consequently represents the final value sampled by the control unit 16.

The block 54 is followed by a block 55 in which the control unit 16 calculates the value estimated for the pressure difference $\Delta P_1$ present at the ends of the injector 12 at the end of the injection operation INJ on the basis of the pressure $P_{CAM}(\phi_{INJ})$ estimated and of the pressure $P_{FUEL}$ measured. This value is obtained by subtracting the pressure $P_{CAM}(\phi_{INJ})$ estimated in the combustion chamber 4 from the value of the pressure $P_{FUEL}$ detected in the fuel manifold 11, i.e.

$$\Delta P_1 = P_{FUEL} - P_{CAM}(\phi_{INJ}).$$

The block 55 is followed by a block 56 in which the control unit 16 calculates the value of the flow rate G of the injector 12 during the injection INJ on the basis of the value estimated for the pressure difference $\Delta P_1$. This calculation is effected by means of interpolation on two-dimensional flow rate/pressure difference curves stored in the control unit 16 and obtained by means of theoretical calculations and experimental tests during the design phase of the engine 2.

It is known that variations in the voltage of the battery can cause considerable differences in the flow rate of the fuel pump which supplies the fuel manifold 11 and, consequently, can vary the flow rate of the injector 12. In order also to take account of this factor, before calculating the flow rate G of the injector 12, the control unit 16 also detects the voltage of the battery $V_{BAT}$ by means of the sensor 25 and then effects interpolation on three-dimensional flow rate/pressure difference/voltage curves. The formula used to determine the flow rate G of the injector is therefore as follows:

$$G = G(\Delta P) + G(V_{BAT}).$$

The flow rate G of the injector is therefore calculated in the block 56 on the basis of the preceding formula, where the pressure difference $\Delta P$ is equal to the value $\Delta P_1$ provided by the block 55.

The output of the block 56 is followed by a block 57 in which the control unit 16 calculates a first delivery time interval $\Delta t_{INJ1}$ on the basis of the flow rate G estimated in the block 55. In particular, the interval $\Delta t_{INJ1}$ is calculated by adding a term given by the quotient of the value of the quantity of fuel to be injected $QB_{INJ}$ (calculated in the block 40) and the value of the flow rate G of the injector 12 (calculated in the block 55) and an offset term $t_{OFF}$. The offset term serves to take account of the incidence of any typical characteristics of the injector 12 in the quantity of fuel injected (e.g. the delay with which the control pulse of the control unit 16 responds, or the waiting time and the flight time. This offset term $t_{OFF}$ is estimated by adding a term $t_{OFF}(\Delta P)$ obtained from two-dimensional time/pressure difference curves to a term $t_{OFF}(V_{BAT})$ obtained from two-dimensional time/battery voltage curves. These curves are also stored in the control unit 16 and are produced by means of theoretical calculations and experimental tests during the design phase of the engine 2.

The general formula used to calculate the delivery time interval is therefore as follows;

$$\Delta t_{INJ} = \frac{QB_{INJ}}{G} + t_{OFF}(\Delta P) + t_{OFF}(V_{BAT}).$$

The interval $\Delta t_{INJ1}$ is then calculated in the block 57 on the basis of the preceding formula, where $\Delta P$ is equal to the value $\Delta P_1$ provided by the block 55.

It should be noted at this point that the interval $\Delta t_{INJ1}$ represents only a first estimation of the delivery interval calculated departing from the assumption that the pressure $P_{CAM}$ in the combustion chamber 4 is constant during the injection (i.e. equal to $P_{CAM}(\phi_{INJ})$), while, in reality, the pressure $P_{CAM}$ can also vary considerably during the injection.

Figure 5:
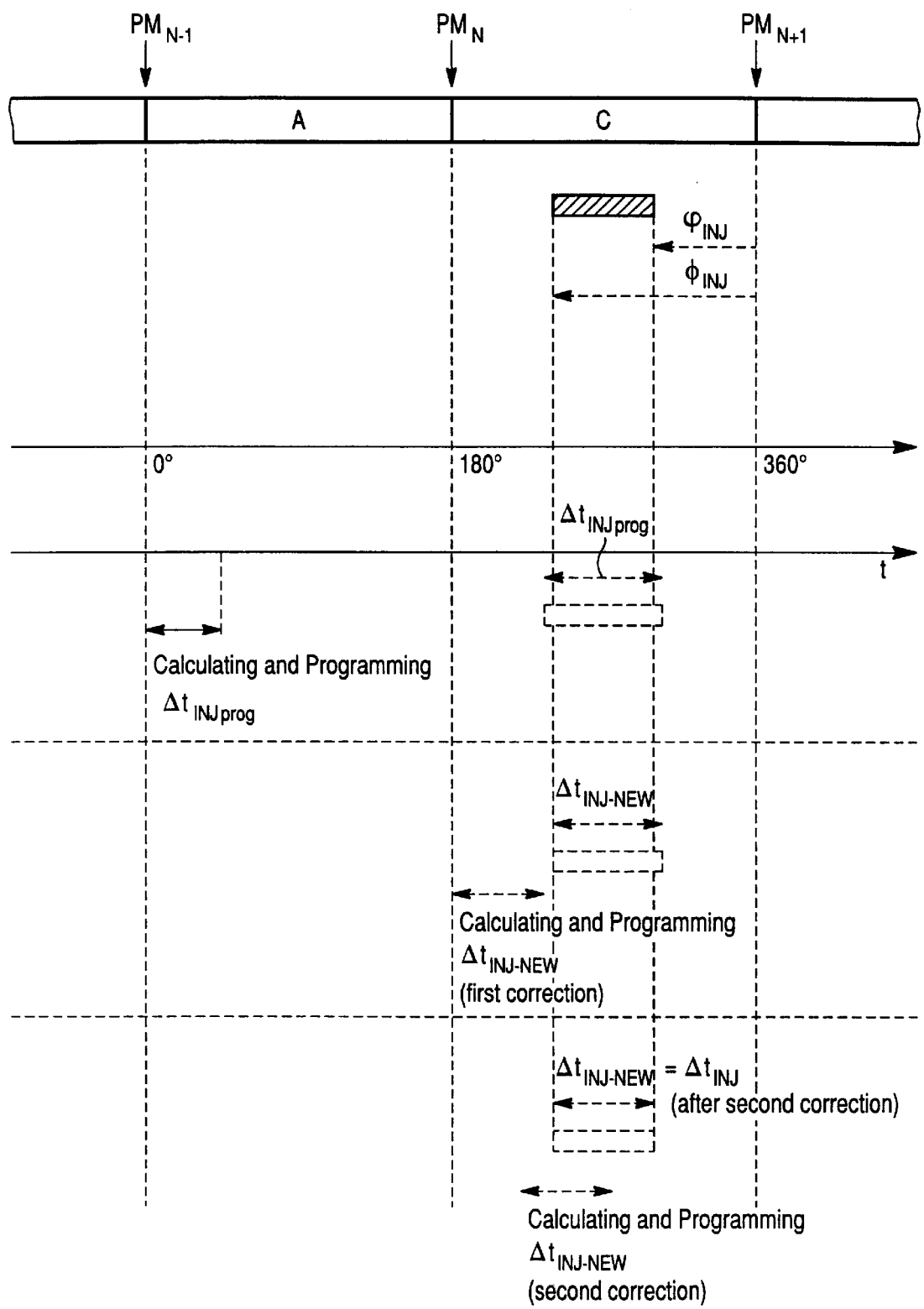
FIG. 5 shows the application of the control method with respect to injection during the compression stroke.

The block 57 is followed by a block 58 in which the control unit 16 determines the initial injection phase $\phi_{INJ}$ on the basis of the value of the injection advance $\phi_{INJ}$ and of the time interval $\Delta t_{INJ1}$, representing the initial theoretical moment of the injection (FIG. 5).

The block 58 is followed by a block 59 in which the control unit 16 estimates the pressure $P_{CAM}(\phi_{INJ})$ which will be present in the interior of the combustion chamber 4 at the initial theoretical moment of the injection on the basis of the function f (FIG. 8) and of the value of the initial injection phase $\phi_{INJ}$.

In this manner, the estimations for the pressure in the combustion chamber 4 corresponding to the initial and final theoretical moments of the injections are thus available, i.e. the values $P_{CAM}(\phi_{INJ})$ and $P_{CAM}(\phi_{INJ})$.

The block 59 is followed by a block 60 in which the control unit 16 calculates an estimation of the mean value $P_{CAMmean}$ of the pressure in the combustion chamber 4 during the injection INJ, by means of the equation:

$$P_{CAMmean} = \frac{P_{CAM}(\varphi_{INJ}) + P_{CAM}(\phi_{INJ})}{2}.$$

The output of the block 60 is followed by a block 61 in which the control unit 16 once again calculates the delivery interval of the injector 12 from the value of the actual pressure $P_{FUEL}$ in the fuel manifold 11 and from the estimation of the mean pressure $P_{CAMmean}$ in the combustion chamber 4, i.e. from the pressure difference $\Delta P_2 = P_{FUEL} - P_{PCAMmean}$. In particular, the operations performed by the control unit 16 in order to calculate the new delivery interval $\Delta t_{INJprog}$ are exactly those already described in blocks 56 and 57.

It is known that the new delivery interval $\Delta t_{INJprog}$ represents a much more accurate estimation of the delivery interval than the estimation provided by the interval $\Delta t_{INJ1}$ at the output of the block 57. Programming of the delivery interval $\Delta t_{INJprog}$ is moreover effected in the block 61, i.e. the pilot circuit of the injector 12 is programmed, a circuit referred to by the expression "TPU".

The control unit 16 therefore programmes the delivery time interval $\Delta t_{INJprog}$ during the time elapsing between the dead centre $PM_{N-1}$ and the dead centre $PM_N$ (see FIG. 5).

Figure 7:
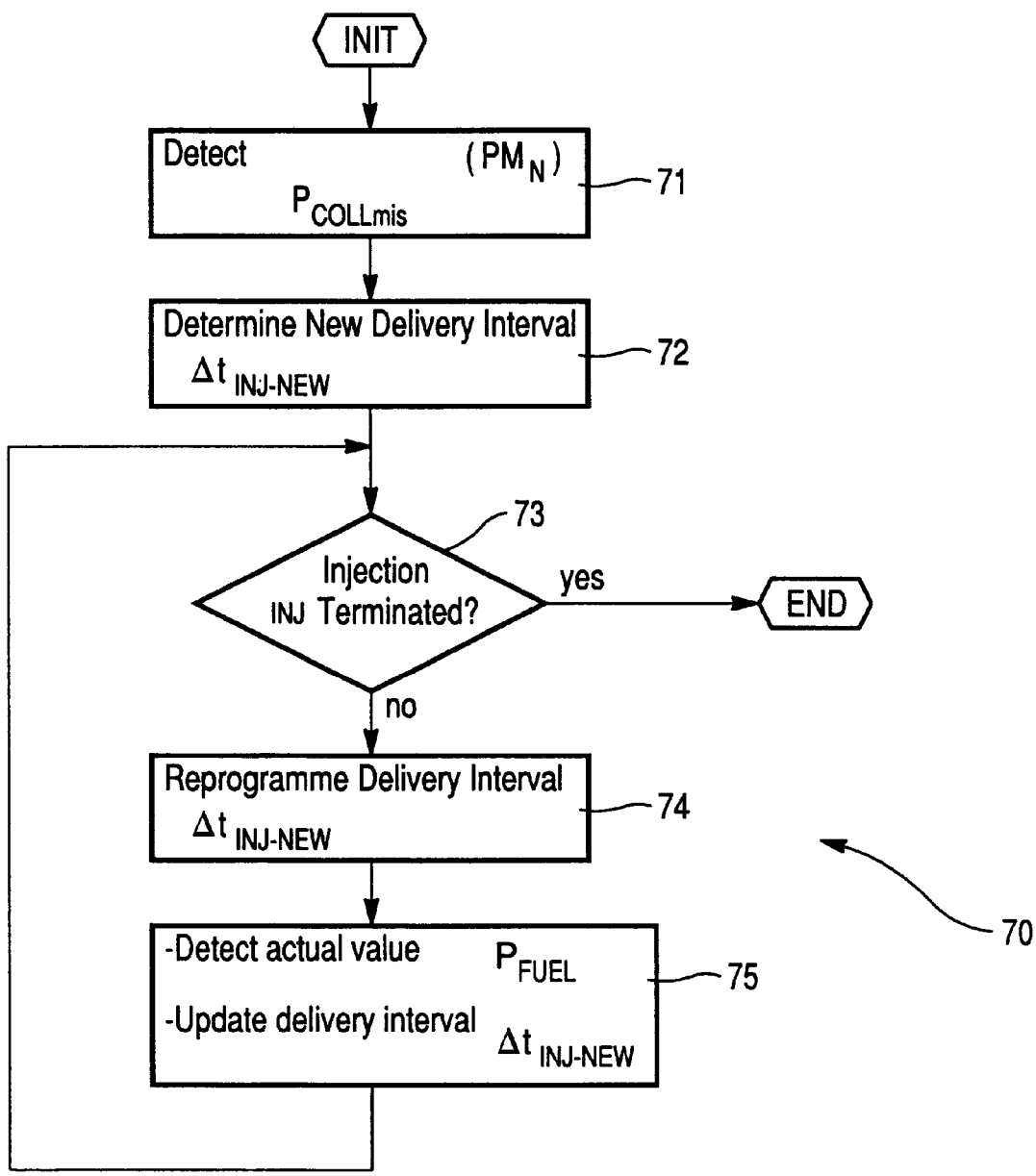

The functional block 70 effected from the moment $PM_N$ and representing a block for correcting the delivery interval $\Delta t_{INJprog}$ will not be described with reference to FIG. 7.

The initial block INIT is followed by a block 71 in which the control unit 16 detects the pressure $P_{COLLmis}(PM_N)$ present in the interior of the suction manifold 5 at the moment $PM_N$.

The output of the block 71 is followed by a block 72 in which the control unit 16 performs the same operations described in blocks 53 to 61 (FIG. 6) so as to determine a new delivery interval $\Delta t_{INJ-NEW}$ on the basis no longer of the pressure $P_{COLL}(PM_N)$ estimated in the suction manifold 5, but of the actual pressure $P_{COLLmis}(PM_N)$ measured in the said manifold 5. The determination of the new delivery interval $\Delta t_{INJ-NEW}$ is effected from the actual value of the pressure $P_{FUEL}$ in the fuel manifold 11 (value measured after the moment $PM_N$) and on the basis of a new estimation of the mean value $P_{CAMmeanNEW}$ of the pressure in the combustion chamber 4 (estimation calculated from $P_{COLLmis}(PM_N)$).

It should be stressed that the calculation performed in block 72 of the control unit 16 can be effected when the injection operation INJ has already begun since this injection will have been programmed before the moment $PM_N$ by means of the operations defining block 50.

The output of the block 72 is followed by a block 73 in which the control unit 16 checks whether the injection operation INJ has already terminated or not (the check is effected by testing a status flag of the pilot circuit (TPU) of the injector).

If the result of the check indicates that the injection INJ has already terminated (i.e. the injector 12 has already been closed), the procedure terminates (END block). The injection operation has clearly taken place in accordance with block 50 (i.e. the delivery time interval $\Delta t_{INJprog}$ has been actuated). On the other hand, if the result of the check indicates that the injection INJ has not yet terminated (i.e. that the injector has not yet been opened or not yet been closed), the block 73 is followed by a block 74.

In the block 74, the control unit 16 reprogrammes the injection operation on the basis of the new delivery interval $\Delta t_{INJ-NEW}$ provided by the block 72. A first correction of the opening time of the injector is effected in this manner (see FIG. 5) in order to increase the accuracy compared to that provided by the delivery interval $\Delta t_{INJprog}$ at the output of the block 50.

The output of the block 74 is then followed by a block 75 in which the control unit 16 first detects the actual value of the pressure $P_{FUEL}$ in the fuel manifold, then calculates the delivery interval once again (according to the methods already described), using the difference between the value $P_{FUEL}$ just detected and the final value $P_{CAMmeanNEW}$ estimated for the mean pressure in the combustion chamber 4 as the value of the pressure difference $\Delta P$.

The output of block 75 then returns to block 73 already mentioned and, if the injection operation INJ has not yet terminated, the injection operation is reprogrammed once again (in the pilot circuit TPU of the injector), i.e. a second correction of the opening time of the injector is performed (see FIG. 5) in order to increase the accuracy compared to that provided by the delivery interval $\Delta t_{INJ-NEW}$ at the output of the block 72. From this point, the sequence of operations described in blocks 74 and 75 is repeated.

This determines a correction cycle (blocks 73, 74 and 75) which is performed until the injection operation INJ has terminated in order to take the instantaneous variations of the pressure in the fuel manifold 11 into account. This guarantees optimum regulation of the delivery time interval ensuring the supply of the required quantity of fuel $QB_{INJ}$ to the interior of the cylinder 3.

Figure 9:
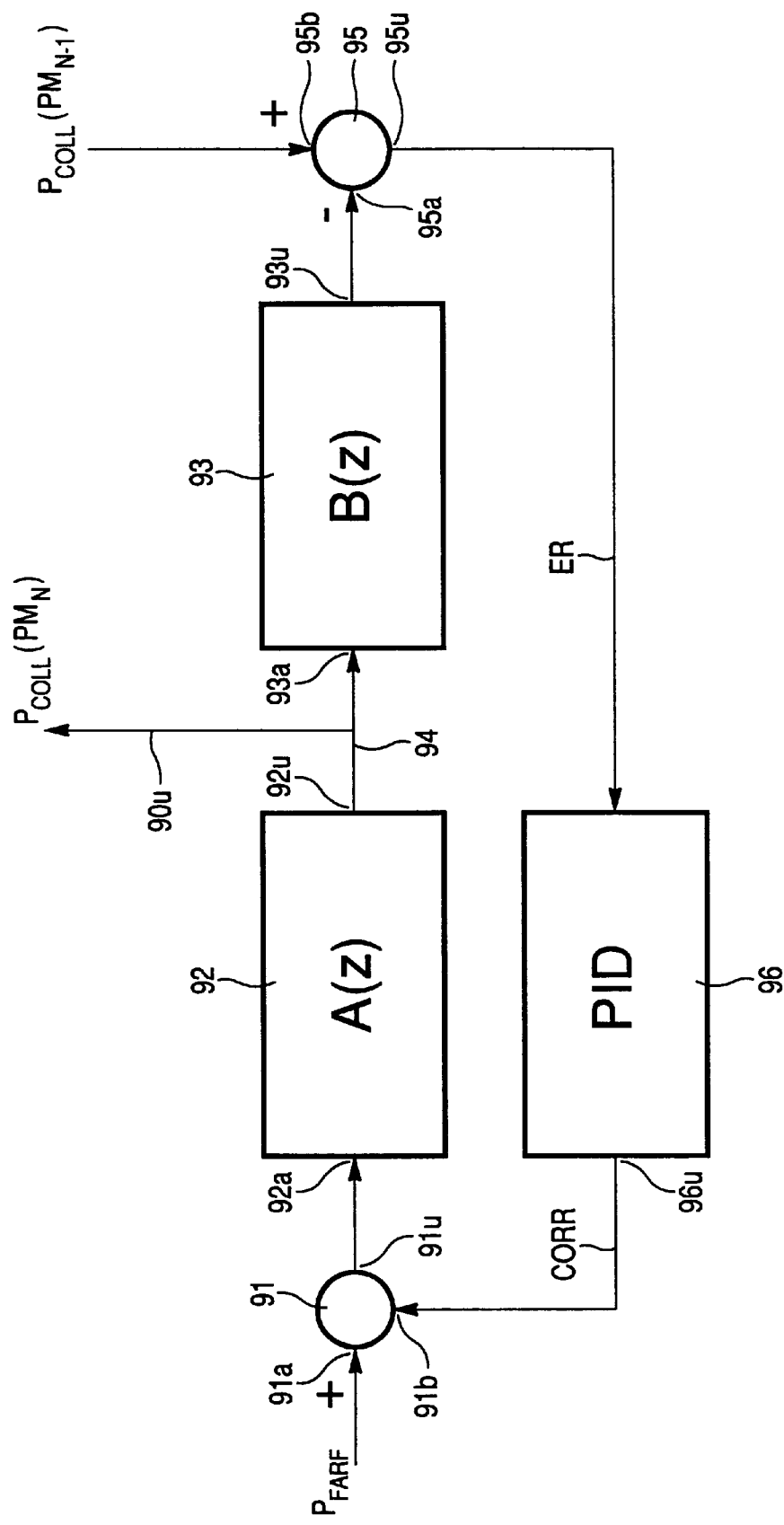
FIG. 9 is a block diagram of an estimating circuit forming part of the control device of FIG. 1.

The method and the estimating circuit 90 used to estimate the value $P_{COLL}(PM_N)$ of the pressure in the suction manifold 5 at the moment $PM_N$ from the data available at the moment $PM_{N-1}$ will now be described with particular reference to FIG. 9 (this estimation is effected in block 51 of FIG. 6).

This method required the knowledge of five operating parameters of the engine 2, i.e. the number of revolutions of the engine rpm, the temperature $T_{AC}$ of the coolant, the temperature $T_{AR}$ of the air sucked in by the suction manifold 5, the position $P_{FARF}$ of the throttle valve 19 and the pressure $P_{COLL}$ in the suction manifold 5. As already stated, the values of these parameters at the moment $PM_{N-1}$ are used to estimate the pressure value $P_{COLL}(PM_N)$ at the moment $PM_N$.

The estimating circuit 90 comprises a summation node 91 which has a first summation input 91a which receives the signal $P_{FARF}$ generated by the sensor 18 and an output 91u connected to an input 92a of a circuit 92. The circuit 92 performs a transfer function A(z) which models a transmission means, in particular the portion of the suction manifold 5 included between the throttle valve 19 and the input to the combustion chamber 4. The transfer function A(z) is advantageously implemented by means of a numerical filter, in particular a low-pass filter, the coefficients of which are functions of the rpm, $T_{AC}$ and $T_{AR}$ signals generated by respective sensors 20, 23 and 22.

The circuit 90 moreover comprises a circuit 93 which has an input 93a connected to an output 92u of the circuit 92 by means of a line 94. The line 94 communicates with the output 90u of the circuit 90. The circuit 93 performs a transfer function B(z) which models the delays of the sensor 17, which is capable to detect the pressure $P_{COLL}$ in the said suction manifold 5, the signal conditioning delays (filtering, conversion and processing of the pressure signal $P_{COLL}$) and the delays due to the physical actuation of the injection.

The transfer function B(z) is advantageously implemented by means of a numerical filter, in particular a low-pass filter, the coefficients of which are functions of the rpm, $T_{AC}$ and $T_{AR}$ signals generated by respective sensors 20, 23 and 22.

The circuit 93 has an output 93u which is connected to a first subtraction input 95a of a node 95 which moreover has a second summation input 95b to which the pressure signal $P_{COLL}(PM_{N-1})$ is supplied.

The summation node 95 moreover has an output 95u which is connected to an input of a correction circuit 96 advantageously formed by a proportional-integral-derivative (PID) network which has an output 96u which communicates with a second input 91b of the node 91.

In use, the circuit 92 receives at its input the signal $P_{FARF}$ corrected by a correction signal CORR generated by the circuit 96 and generates at its output a signal which estimates the pressure in the suction manifold 5 in the vicinity of the pressure sensor 17 at the next dead centre ($PM_N$). The output signal $P_{COLL}(PM_N)$ of the circuit 92 is then supplied to the circuit 93 which generates at its output a pressure signal of the suction manifold 5 including the response inertia of the pressure sensor, the delays of the system and the actuation delays. The output signal of the circuit 93 is then compared with the (real) signal of the value of the pressure in the suction manifold 5 generated by the sensor 17 in such a manner that there is an error signal ER at the output of the node 95 which is then processed by the circuit and which in turn generates at its output a signal CORR.

As a result of the feedback produced by the circuit 96, the error signal ER is minimised and the signal $P_{COLL}(PM_N)$ at the output of the circuit 92 therefore represents a measure of the pressure in the suction manifold 5 less the delays of the sensor, the delays of the calculating system and the actuation delays.

The method of controlling injection described hereinabove allows for the programming of the delivery time interval with optimum accuracy, ensuring that exactly the required quantity of petrol will be injected in each injection operation, irrespective of the operating conditions of the engine, or irrespective of whether the engine is under stabilised or transient conditions.

It should be stressed that the use of the function f (illustrated in FIG. 8) to estimate the pressure in the combustion chamber 4 does not constitute a limitation, as the real course of this function can be slightly different depending on the moment at which combustion is triggered, but where the injection operations are taking place (illustrated by the arrows Fr), the function f approaches the real course in an optimum manner.

It will finally be clear that the method can be modified or varied without thereby going beyond the scope of protection of this invention.

In fact, according to one variant, with respect to injection operations in which extreme accuracy is not required (e.g. pre-injection $INJ_A$ in the suction stroke (FIG. 3) or injection in the exhaust stroke $INJ_S$), the control operations defined in block 70 (FIG. 7) can be omitted. In this case, the actual delivery interval coincides with the delivery interval $\Delta t_{INJprog}$ programmed with a dead centre advance.

What is claimed is:

1. Method of controlling the direct injection of fuel into at least one combustion chamber (4) of an internal combustion engine (2), the engine (2) comprising at least one cylinder (3) defining the said chamber (4), a suction manifold (5) connected to the cylinder (3), at least one fuel manifold (11) and at least one injector (12) connecting the fuel manifold (11) to the said chamber (4) for injecting the fuel directly therein, the method being characterised in that, in order to effect a generic injection operation (INJ) in relation to a first stroke (C) of the cylinder starting from a first dead centre ($PM_N$), it comprises the following steps:

a) calculating (40) the quantity of fuel ($QB_{INJ}$) to be injected;
   b) estimating (51) during a second stroke (A) of the cylinder preceding the said first stroke (C) the pressure ($P_{COLL}(PM_N)$) which will be present in the suction manifold (5) at the first dead centre ($PM_N$);
   c) estimating (52) an injection advance ($\phi_{INJ}$) for the said injection (INJ) on the basis of the estimation of the pressure ($P_{COLL}(PM_N)$) in the suction manifold (5);
   d) detecting (54) the pressure ($P_{FUEL}$) in the fuel manifold (11);
   e) estimating (53, 55, 56, 57, 58, 59, 60) the means pressure ($P_{CAMmean}$) which will be present in the combustion chamber (4) during the injection (INJ) on the basis of the estimation effected in steps b) and c) and on the basis of a function (f) representative of the course of the pressure in the combustion chamber (4) under reference operating conditions of the engine;
   f) estimating (61) the mean flow rate (G) of the injector (12) during the injection (INJ) on the basis of the pressure difference ($\Delta P_2$) between the pressure ($P_{FUEL}$) detected in the fuel manifold (11) and the mean pressure ($P_{CAMmean}$) estimated in the combustion chamber (4), and
   g) calculating and programming (61) a delivery interval ($\Delta t_{INJprog}$) for the injector (12) on the basis of the mean flow rate (G) estimated and of the quantity of fuel ($QB_{INJ}$) calculated.

2. Method according to claim 1, characterised in that the said function (f) provides the course of the pressure in the combustion chamber (4) standardised to the value of atmospheric pressure in order to vary the angle of rotation of the engine when the throttle valve (19) is in a completely open state.

3. Method according to claim 1, characterised in that the said value of the delivery interval ($\Delta t_{INJprog}$) is calculated by dividing the quantity of fuel ($QB_{INJ}$) calculated by the said flow rate (G) estimated for the injector (12).

4. Method according to claim 1, characterised in that the said injection (INJ) can take place during the suction, compression and/or exhaust stroke of the said cylinder (3).

5. Method according to claim 1, characterised in that the said step e) of estimating the mean value ($P_{CAMmean}$) of the pressure in the combustion chamber (4) comprises the following sub-steps:

e1) estimating (53) the pressure (($P_{CAM}(\phi_{INJ})$)) which will be present in the interior of the combustion chamber (4) in correspondence with the said injection advance ($\phi_{INJ}$) on the basis of the value estimated for the pressure in the suction manifold (5) and of the said function (f) representative of the course of the pressure in the combustion chamber (4), the said injection advance ($\phi_{INJ}$) defining a theoretical extreme of the injection (INJ);

e2) estimating 55, 56, 57, 58, 59) the pressure (($P_{CAM}(\phi_{INJ})$)) which will be present in the combustion chamber (4) in correspondence with an injection phase ($\phi_{INJ}$) defining the other theoretical extreme of the injection (INJ), and e3) calculating the means (60) of the two pressure values ($P_{CAM}(\phi_{INJ})$, $P_{CAM}(\phi_{INJ})$) estimated in sub-steps e1) and e2).

6. Method according to claim 5, characterised in that the estimation in sub-step e2) is effected by performing the following operations:

e21) calculating (55) a pressure difference ($\Delta P_1$) present at the ends of the injection (12) by subtracting the pressure (($P_{CAM}(\phi_{INJ})$)) estimated in sub-step e1) from the pressure ($P_{FUEL}$) detected in the fuel manifold (11);

e22) estimating (56) the flow rate (G) of the injector (12) during the injection (INJ) on the basis of the pressure difference ($\Delta P_1$) calculated according to the operation e22);

e23) calculating (57) a first estimation of the delivery interval ($\Delta t_{INJ1}$) for the injector (12) on the basis of the flow rate estimated for the injector (12) in operation e22) and on the basis of the quantity of fuel ($QB_{INJ}$) calculated;

e24) calculating (58) the said injection phase ($\phi_{INJ}$) on the basis of the said first estimation of the delivery interval ($\Delta t_{INJ1}$) and of the said injection advance ($\phi_{INJ}$), and e25) estimating (59) the pressure (($P_{CAM}(\phi_{INJ})$)) which will be present in the combustion chamber (4) in correspondence with the injection phase ($\phi_{INJ}$) on the basis of the said pressure estimated in the suction manifold (5) and of the said function (f) representative of the course of the pressure in the combustion chamber (4).

7. Method according to claim 1, characterised in that it moreover comprises the subsequent step of measuring the voltage of the battery ($V_{BAT}$) of the engine (2) before estimating the said mean flow rate (G) of the injection (12).

8. Method according to claim 7, characterised in that the said value of the mean flow rate (G) of the injector (12) during the injection (INJ) is calculated both on the basis of the pressure difference ($\Delta P_2$) between the pressure ($P_{FUEL}$) detected in the fuel manifold (11) and the mean pressure ($P_{CAMmean}$) estimated in the combustion chamber (4) and on the basis of the said value ($V_{BAT}$) measured for the voltage of the battery.

9. Method according to claim 7, characterised in that the said value of the delivery interval ($\Delta t_{INJprog}$) is calculated by dividing the quantity of fuel ($QB_{INJ}$) calculated by the said flow rate (G) estimated for the injector (12) and adding to this quotient a first offset value ($t_{OFF}(\Delta P)$) and a second offset value ($t_{OFF}(V_{BAT})$), the first offset value ($t_{OFF}(\Delta P)$) being estimated on the basis of the said mean value ($\Delta P$) of the pressure difference at the ends of the injector (12), and the second offset value ($t_{OFF}(V_{BAT})$) being estimated on the basis of the value measured for the voltage of the battery ($V_{BAT}$).

10. Method according to claim 1, characterised in that the said second stroke (A) of the cylinder is the stroke of the cylinder immediately preceding the said first stroke (C) and starts from a second dead centre ($PM_{N-1}$) of the cylinder, the said steps b), c), d), e), f) and g) being performed in the time elapsing between the second dead centre ($PM_{N-1}$) and the first dead centre ($PM_N$).

11. Method according to claim 10, characterised in that the sad step b) provides for estimating the pressure ($P_{COLL}(PM_N)$) in the suction manifold (5) at the first dead centre ($PM_N$) on the basis of the values measured at the second dead centre ($PM_{N-1}$) for a plurality of physical quantities measured in the engine.

12. Method according to claim 11, characterised in that the said physical quantities comprise the number of revolutions (rpm) of the engine (2), the temperature ($T_{AC}$) of the coolant, the position ($P_{FARF}$) of the throttle valve (19), the pressure ($P_{COLL}$) of the air sucked in by the suction manifold (5) and the temperature ($T_{AR}$) of the air sucked in by the suction manifold (5).

13. Method according to claim 10, characterised in that the said step c) provides for estimating (52) the said injection advance ($\phi_{INJ}$) on the basis of the estimation of the pressure ($P_{COLL}(PM_N)$) in the suction manifold (5) and on the basis of the value of the number of revolutions (rpm) of the engine measured at the second dead centre ($PM_{N-1}$).

14. Method according to claim 13, characterised in that the said injection advance ($100_{INJ}$) defines the final theoretical moment of the said injection (INJ).

15. Method according to claim 1, characterised in that it comprises the subsequent step, departing from the said first dead centre ($PM_N$), of performing a procedure (70) for correcting the said delivery interval ($\Delta t_{INJprog}$) programmed in order to take account of any variations in the pressure in the fuel manifold (11) and the actual pressure in the suction manifold at the first dead centre ($PM_N$).

16. Method according to claim 15, characterised in that the said correction procedure (70) comprises the following subsequent steps:

h) detecting (71) the pressure ($P_{COLLmis}(PM_N)$) in the suction manifold (5) in correspondence with the first dead centre ($PM_N$);

i) calculating (2) the delivery interval core again on the basis of the value ($P_{COLLmis}(PM_N)$) detected for the pressure in the suction manifold (5) according to the methods defined in steps d), e), f) and g) in order to obtain the new delivery time interval ($\Delta t_{INJ-NEW}$);

l) checking (73) whether the injection (INJ) programmed during the said second stroke (A) of the cylinder has already terminated, and m) reprogramming (74) the said injection (INJ) on the basis of the new delivery interval ($\Delta t_{INJ-NEW}$) if the check leads to a negative result.

17. Method according to claim 16, characterised in that the said correction procedure (70) moreover comprises, after step m), the subsequent steps of:

n) detecting (75) once again the pressure ($PM_{FUEL}$) present in the interior of the fuel manifold (11), o) calculating (75) the delivery interval once again on the basis of the new value detected for the pressure in the suction manifold (11);

p) checking (73) whether the injection (INJ) programmed in step m) during the said first stroke (A) of the cylinder has already terminated;

q) reprogramming (74) the said injection (INJ) on the basis of the new delivery interval ($\Delta t_{INJ\text{-}NEW}$) calculated in step o) if the check leads to a negative result, and r) repeating the operations performed in steps n), o), p) and q) until the result of the check indicates that the injection (INJ) has already terminated.

\* \* \* \* \*